Dec. 21, 1965 H. TYZACK 3,224,282

TUNER FOR TELEVISION RECEIVER

Filed Oct. 4, 1962 2 Sheets-Sheet 1

INVENTOR.
Harold Tyzack
BY Mueller & Aichele
Attys.

INVENTOR.
Harold Tyzack
BY Mueller & Aichele
Attys.

3,224,282

TUNER FOR TELEVISION RECEIVER

Harold Tyzack, Schiller Park, Ill., assignor to Motorola, Inc., Chicago, Ill., a corporation of Illinois Filed Oct. 4, 1962, Ser. No. 228,368
10 Claims. (Cl. 74—10.15)

This invention relates to television receivers and more particularly to a tuner drive mechanism for a television receiver.

Television broadcasting in the ultra high frequency spectrum is becoming more prevalent, due in part to such things as the desire for more broadcast stations and for a more full use of the allocated TV frequencies. Although the feature of preset fine tuning is desirable in UHF as well as VHF tuners, the relatively large number of UHF channels make conventional VHF systems of preset fine tuning impractical.

Accordingly, an object of this invention is to provide a tuner drive mechanism for a television tuner which will position a tuner shaft at preset positions of rotation and which is particularly adaptable to rotary tuners in the UHF range.

Another object of the invention is to provide an improved tuner drive mechanism for a tuner having an infinitely variable rotary shaft.

Still another object of the invention is to provide a simple, low cost tuner drive mechanism for use with tuners in the UHF range.

A feature of the invention is the provision, in an improved tuner drive mechanism, of a cam displaceable gear sector which drives a gear train to impart torque to the rotary tuner shaft.

Still another feature of the invention is the provision, in a tuner drive mechanism, of a gearing system for imparting torque from a pair of independent controls to a tuner shaft, including a sun gear, a plurality of planet gears engaging the sun gear, and an annular gear surrounding the planet gears and in engagement therewith.

Another feature of the invention is the provision, in the above described system, of a spring bias for the annular gear to limit its angular displacement.

Referring now to the drawings, FIG. 1 is a side elevation of a tuner and tuner drive mechanism constructed in accordance with the invention;

Briefly, the invention comprises a tuner drive mechanism for operating a UHF tuner in a television receiver. A control shaft, which may be knob driven, is mounted on an axis common with the tuner shaft to be operated thereby. At one end of the control shaft there is mounted a detent positioned sun gear. Surrounding the sun gear are three planet gears in engagement therewith, each of the planet gears being rotatably mounted on a drive plate fixed to the tuner shaft. Surrounding the planet gears and in engagement therewith is an annular gear which is driven by a crown gear, both gears rotating independently of the control shaft. The crown gear is in engagement with an idler pinion which in turn is engaged by a gear sector displaceable by a presettable cam screw arrangement. Thus rotation of the control shaft will rotate the detent positioned sun gear to rotate the planet gears and move the axis of the planet gears about the sun gear causing the tuner shaft to rotate and to be detent positioned as well.

Fine tuning, or exact adjustment of the tuner shaft within a frequency range associated with that detent position is accomplished as the cam means displace the gear sector. This transmits torque through the idler pinion and crown gear to the annular gear which once again causes displacement of the planet gears, only in a greatly reduced ratio. The range of adjustment which is accomplished by the cam screws is such that adjacent ranges overlap to provide versatility in pre-setting the UHF channel positions. In other words, although two UHF stations may be spaced closely on the frequency spectrum, the overlap feature permits each station to be set for detent positioning.

Figures 1, 2:
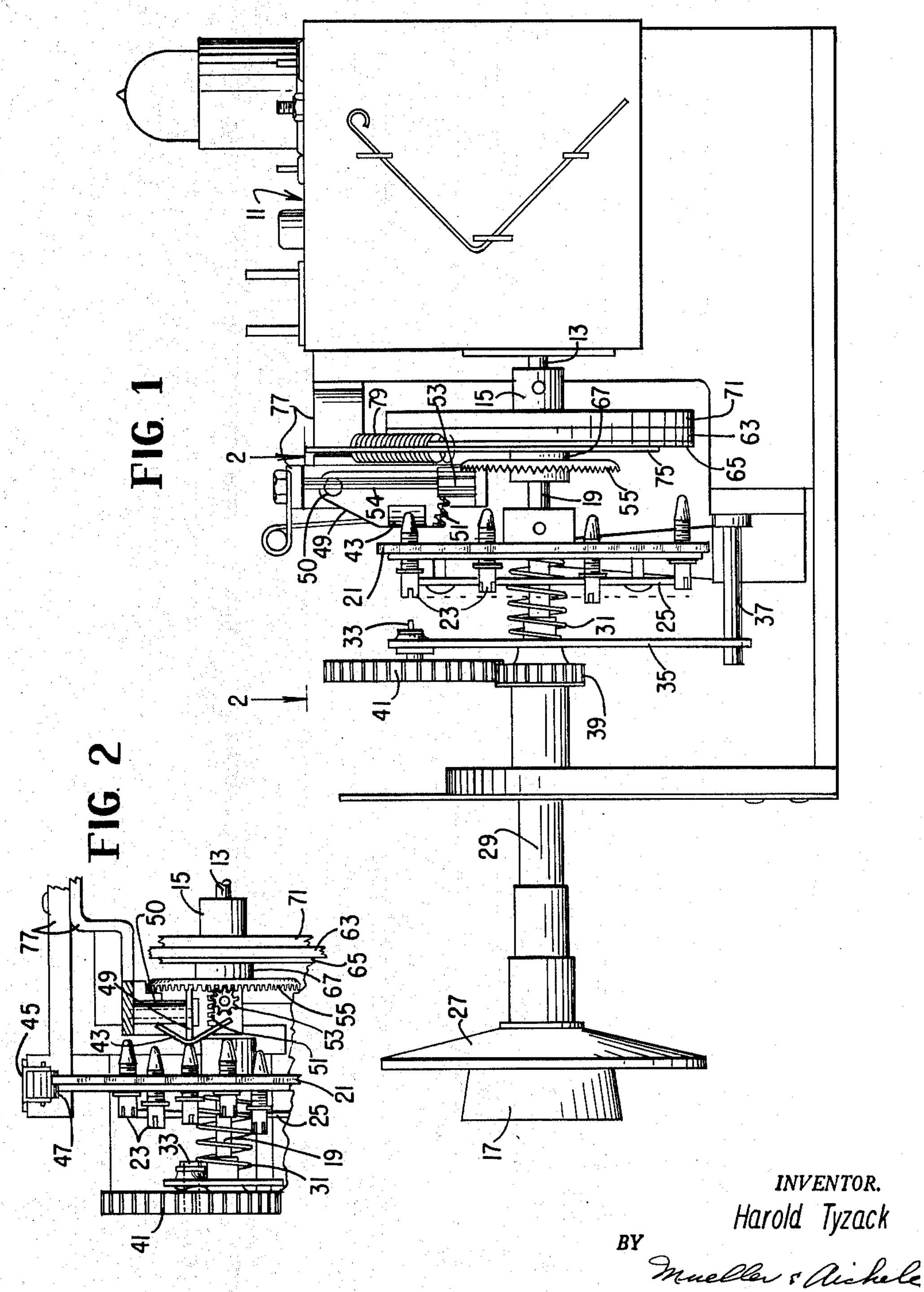
FIG. 2 is a sectional view taken along the line 2—2 of FIG. 1.

Referring now to FIG. 1, there is shown UHF tuner 11 which may be of the type having an infinitely variable rotary shaft 13. Shaft 13 may be driven by bushing 15 which is fixed to part of a gearing arrangement which will be described subsequently. Tuner 11 is controlled by means of a knob 17, operable from without the receiver and fixed to shaft 19. Shaft 19 has its opposite end connected to the gearing arrangement which will be subsequently described. This gearing arrangement permits the user of the television set in which tuner 11 is used to preset a detent positioning mechanism for those UHF channels the reception of which is desired.

A detent positioning wheel 21 is mounted on shaft 19 to be rotatable therewith. A plurality of adjustable cam screws 23 are mounted in wheel 21 and are steadied by a disc 25 mounted on wheel 21. Screws 23 are adjustable from without the receiver by means of a knob 27, which is mounted on a sleeve 29. Knob 27 is depressible to move sleeve 29 against the bias of a spring 31 to bring a screwdriver 33 into engagement with one of cam screws 23. Screwdriver 33 is mounted on a guide arm 35 which moves with sleeve 29 when knob 27 is depressed. Arm 35 is guided at its opposite end by guide post 37. A drive gear 39 is mounted on sleeve 29 and is rotatable therewith. Drive gear 39 is in engagement with screw driver gear 41 which turns screwdriver 33. Thus cam screws 23 may be adjusted for presetting the UHF channel position by depressing knob 27 to bring screwdriver 33 into engagement therewith, and by turning knob 27 to transmit torque through gears 39 and 41 to screwdriver 33.

A cam follower 43 is engageable serially by screws 23 according to the position of shaft 19 and wheel 21. The positions of shaft 19 and wheel 21 are controlled by detent arm 45 and contact 47 (see FIG. 2). As a particular cam screw 23 strikes cam follower 43, the pivotal member 49, of which cam follower 43 is a part, will pivot on post 50 fixed to frame 77 of the tuner. This movement is transmitted by a gear sector 51 on member 49, through an idler pinion 53 engaging gear sector 41, to a crown gear 55 engaging idler pinion 53. Idler pinion 53 rotates on axle 54 mounted to part of frame 77. The movement of crown gear 55 will therefore depend on the setting of the particular cam screw 23 in engagement with cam follower 43.

Figure 3:
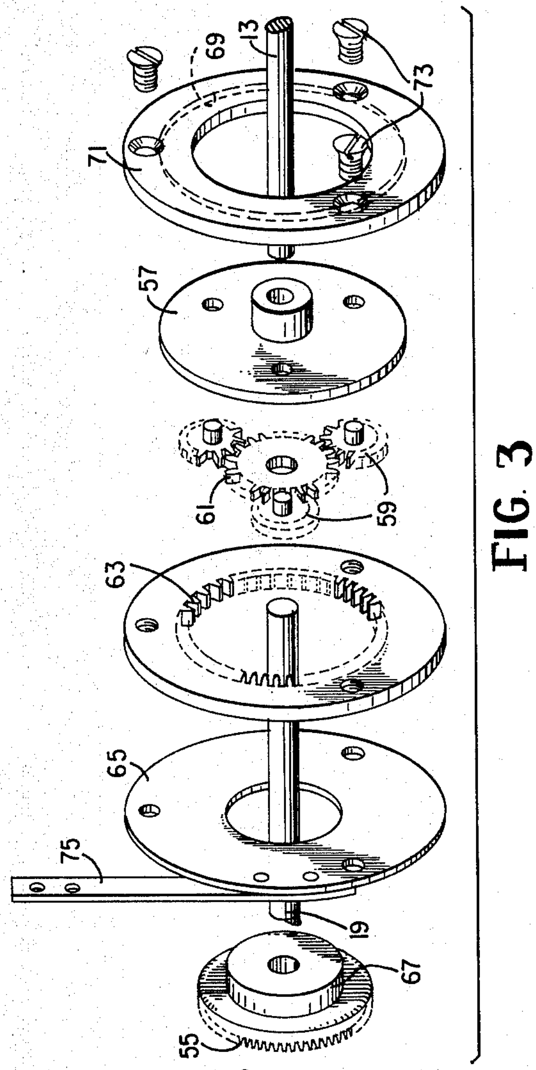
FIG. 3 is an exploded view of the gearing arrangement for driving the tuner shaft of FIG. 1.
Figure 4:
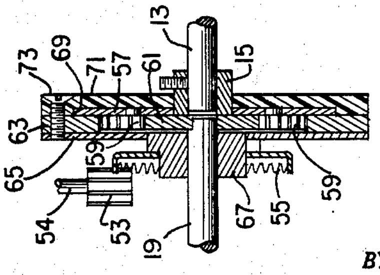
FIG. 4 is a half sectioned assembly view of the gearing arrangement shown in FIG. 3.

Referring now to FIGS. 3 and 4, the construction of the gearing arrangement between shafts 19 and 13 is shown. It is this gearing arrangement which enables both detent tuning and fine tuning of the tuner shaft. Bushing 15, which is secured to shaft 13, is fixedly mounted in a rotatable plate 57. Also mounted in rotatable plate 57 are three planet gears 59. A sun gear 61 for these planet gears is fixedly mounted on the end of shaft 19. Surrounding planet gears 59 is an annular gear 63, which maintains engagement therewith. A second rotatable plate 65 contains a bushing 67 which is fixedly mounted therein. Bushing 67 contains crown gear 55 fixed thereto.

When the gearing is assembled it may be seen that plate 57 fits in a recess 69 in the surface of a cover ring 71. Ring 71 is secured to annular gear 63 and plate 65 by screws 73. It will be apparent therefore that crown gear 55, bushing 67, plate 65, annular gear 63 and ring 71 will all rotate as one unit, whereas sun gear 61 and shaft 19 will rotate together independently from the annular and crown gear assembly.

As shaft 19 is turned by the user of the TV receiver to the next detent position, gear 61 will also turn causing planet gears 59 to turn. As planet gears 59 rotate, they move about the sun gear due to their engagement with annular gear 63. This causes displacement of their axes about shaft 19 causing rotation of plate 57 and bushing 15, and therefore rotation of tuner shaft 13 to the next detent position. Annular gear 63 is prevented from excessive rotational movement by means of an arm 75 which extends from plate 65 and is spring biased to the frame 77 of the tuner by means of spring 79 (see FIG. 1).

Once the desired detent position is attained, fine tuning within the range associated with this position is effected by screws 23 engaging cam follower 43 causing displacement of pivotal member 49 and consequent movement of gear sector 51. This, as previously described, causes rotation of idler pinion 53 and crown gear 55, which rotation is transmitted through bushing 67 and plate 65 to annular gear 63. Rotation of annular gear 63 through the limited arcuate path determined by the bias of spring 79, causes rotation of planet gears 59. Because sun gear 61 is held rigid due to the detent positioning of shaft 19, planet gears 59 will rotate about gun gear 61 during the fine tuning operation, causing rotation of plate 57, bushing 15 and hence tuner shaft 13.

The mechanism may be preset to various channels in the UHF spectrum by adjusting cam screws 23 to predetermined positions. This adjustment provides a supplement to the rough channel tuning afforded by the detent positioning mechanism. Of course it would be unnecessary to have presetting for all channels in the UHF spectrum and a distribution of 23 cam screws about wheel 21 has been found satisfactory, although other numbers are entirely feasible. By dividing the UHF television range bandwidth of 470 megacycles into 23 subranges, whose mean frequencies are approximately 20 megacycles apart, it is possible to utilize a variation within the subrange of approximately 40 megacycles, providing a substantial frequency overlap. This adds versatility to the system as an inherent feature of this construction.

Because of the above gearing, the positioning of the adjusting screws or cam screws 23 creates a lateral motion of the screw, which is mechanically translated through cam follower 43 into a rotary motion for fine tuning the infinitely variable rotary shaft 13 of tuner 11. This eliminates much of the inconvenience presently encountered in previous types of UHF tuner drive mechanisms.

Accordingly, the invention provides an improved tuner drive mechanism for positioning an infinitely variable tuner shaft, which mechanism is particularly adaptable to rotary tuners in the UHF range.

I claim:

1. A drive mechanism for a tuner in a multi-channel wave signal receiver including in combination, a tuner shaft adapted to operate the tuner of the receiver, first torque transmitting means fixed to said tuner shaft for driving the same, a detent positioned control shaft, second torque transmitting means fixed to said control shaft and engaging said first torque transmitting means for detent positioning of said tuner shaft according to the detent position of said control shaft, third torque transmitting means engaging said first torque transmitting means for driving said tuner shaft for fine tuning within a range associated with the detent position determined by said control shaft, cam follower means coupled to said third torque transmitting means for driving the same, presettable adjustable cam means engageable with said cam follower means and operable by said control shaft, said cam follower means displaceable by said cam means a distance sufficient to provide fine tuning of said tuner shaft within a range which overlaps the ranges associated with adjacent detent positions, whereby said tuner drive mechanism may be preset for detent tuning of a channel within the range associated with that detent position.

2. A drive mechanism for a tuner in a multi-channel wave signal receiver including in combination, a tuner shaft adapted to operate the tuner of the receiver, first gear means fixed to said tuner shaft for driving the same, a detent positioned control shaft, second gear means fixed to said control shaft and engaging said first gear means for detent positioning of said tuner shaft by said control shaft, third gear means engaging said first gear means for driving said tuner shaft for fine tuning within a range associated with the detent position determined by said control shaft, a gear sector coupled to drive said third gear means, a cam follower portion on said gear sector for displacing the same, presettable adjustable cam means engageable with said cam follower portion and operable by said control shaft, said cam follower means displaceable by said cam means a distance sufficient to provide fine tuning of said tuner shaft within a range which overlaps the ranges associated with adjacent detent positions, whereby said tuner drive mechanism may be preset for detent tuning of a channel within the range associated with that detent position.

3. A tuner drive mechanism for an ultra-high frequency tuner in a television receiver, which mechanism provides detent channel positioning over a range of the ultra-high frequency spectrum, said mechanism including in combination, a tuner shaft adapted to operate the tuner of the receiver, first gear means fixed to said tuner shaft for driving the same, a detent positioned control shaft, second gear means fixed to said control shaft and engaging said first gear means for detent positioning of said tuner shaft by said control shaft, third gear means engaging said first gear means for driving said tuner shaft for fine tuning within a range associated with the detent position determined by said control shaft, cam follower means coupled to said third gear means for driving the same, a plurality of presettable adjustable cam screws operable by said control shaft to serially engage said cam follower means according to the position of said control shaft, said cam follower means displaceable by each of said cam screws a distance sufficient to provide fine tuning of said tuner shaft within a range which overlaps the ranges associated with adjacent detent positions, whereby said tuner drive mechanism may be preset for detent tuning of a channel within the range associated with that detent position.

4. A tuner drive mechanism for an ultra-high frequency tuner in a television receiver, which mechanism provides detent channel positioning over a range of the ultra-high frequency spectrum, said mechanism including in combination, a tuner shaft adapted to operate the tuner of the receiver, first gear means fixed to said tuner shaft for driving the same, a detent positioned control shaft second gear means fixed to said control shaft and engaging said first gear means for detent positioning of said tuner shaft by said control shaft, third gear means engaging said first gear means for driving said tuner shaft for fine tuning within a range associated with the detent position determined by said control shaft, a gear sector coupled to drive said third gear means, cam follower means on said gear sector for displacing the same, a plurality of presettable adjustable cam screws operable by said control shaft to serially engage said cam follower means according to the position of said control shaft, said cam follower means displaceable by each of said cam screws a distance sufficient to provide fine tuning of said tuner shaft within a range which overlaps the ranges associated with adjacent detent positions, whereby said tuner drive mechanism may be preset for detent tuning of a channel within the range associated with that detent position.

5. A tuner drive mechanism for an ultra-high frequency tuner in a television receiver, which mechanism provides detent channel positioning over a range of the ultra-high frequency spectrum, said mechanism including in combination, a tuner shaft adapted to operate the tuner of the receiver, first gear means fixed to said tuner shaft for driving the same, a detent positioned control shaft having second gear means fixed thereon engaging said first gear means for detent positioning of said tuner shaft by said control shaft, a plurality of presettable adjustable cam means disposed about the axis of said control shaft in fixed relationship thereto, a gear sector displaceable by said cam means, an idler pinion engaging said gear sector and rotatable thereby, a crown gear engaging said idler pinion and rotatable thereby, and third gear means fixed to said crown gear and displaceable thereby, said third gear means engaging said first gear means to impart torque to said tuner shaft for fine tuning the same within a range associated with the detent position thereof whereby said tuner drive mechanism may be preset for detent tuning of a channel within the range associated with that detent position.

6. A tuner drive mechanism for an ultra-high frequency tuner in a television receiver for selecting a desired channel, said mechanism including in combination, a tuner shaft adapted to operate the tuner of the receiver, planet gear drive means fixed to said tuner shaft for driving the same, a detent positioned control shaft having a sun gear fixed thereon engaging said planet gear drive means to impart torque to said tuner shaft for driving the same, a plurality of presettable adjustable cam screws disposed about the axis of said control shaft in fixed relationship thereto, a gear sector displaceable by said cam screws, an idler pinion engaging said gear sector and rotatable thereby, a crown gear engaging said idler pinion and rotatable thereby, and an annular gear fixed to said crown gear and displaceable thereby, said annular gear surrounding and engaging said planet gear drive means to impart torque to said tuner shaft for driving the same, whereby said tuner shaft may be detent positioned to the desired channel by presetting one of said cam screws.

7. A tuner drive mechanism for providing preset detent tuning of a desired channel in a television receiver having a tuner operable by a single rotary tuner shaft, said drive mechanism including in combination, a first drive plate fixed to the tuner shaft for driving the same, said first drive plate having a plurality of planet gears rotatably mounted thereon, a control shaft having a sun gear fixed thereon to engage said planet gears, an annular gear surrounding said planet gears and engaging the same, a plurality of presettable adjustable cam screws disposed about the axis of said control shaft in fixed relationship thereto, a cam follower plate serially engageable with each of said cam screws, a gear sector fixed to said cam follower plate and displaceable therewith, an idler pinion engaging said gear sector and rotatable thereby, a crown gear engaging said idler pinion and rotatable thereby, said crown gear being fixed to said annular gear for rotating the same, whereby the tuner shaft may be detent positioned to the desired channel by presetting one of said cam screws.

8. A tuner drive mechanism for providing preset detent tuning of a desired channel in a television receiver having a tuner operable by a single rotary tuner shaft, said drive mechanism including in combination, a first drive plate fixed to the tuner shaft for driving the same, said first drive plate having three planet gears rotatably mounted thereon with their axis parallel to said tuner shaft, a detent positioned control shaft aligned on a common axis with said tuner shaft and having a sun gear fixed thereon to engage said planet gears, an annular gear surrounding said planet gears and engaging the same, a plurality of presettable adjustable cam screws disposed about the periphery of said control shaft in fixed relationship thereto, cam follower means serially engageable with each of said cam screws according to the position of said control shaft, a gear sector displaceable by said cam follower means, an idler pinion engaging said gear sector and rotatable thereby, a crown gear engaging said idler pinion and rotatable thereby, said crown gear being fixed to said annular gear for rotating the same, said annular gear being spring biased to have a limited angular displacement to permit rotation of said control shaft to be transmitted to said tuner shaft through a gear train formed by said sun, planet and annular gears, whereby the tuner shaft may be detent positioned to the desired channel by presetting one of said cam screws.

9. A drive mechanism for a tuner in a multi-channel wave signal receiver, including in combination, a tuner shaft adapted to operate the tuner of the receiver, first torque transmitting means fixed to said tuner shaft for driving the same, a detent positioned control shaft, second torque transmitting means fixed to said control shaft and engaging said first torque transmitting means for detent positioning of said tuner shaft according to the detent position of said control shaft, third torque transmitting means engaging said first torque transmitting means for driving said tuner shaft for fine tuning within a range associated with the detent position determined by said control shaft, and presettable means coupled to said third torque transmitting means for rotating the same an amount sufficient to provide fine tuning of said tuner shaft within a range that overlaps the ranges associated with adjacent detent positions, whereby said tuner drive mechanism may be preset for detent tuning of a channel within the range associated with that detent position.

10. A drive mechanism for a tuner in a multi-channel wave signal receiver, including in combination, a tuner shaft adapted to operate the tuner of the receiver, planet gear drive means fixed to said tuner shaft for driving the same, a detent positioned control shaft having a sun gear fixed thereon engaging said planet gear drive means to impart torque to said tuner shaft for driving the same, an annular gear surrounding and engaging said planet gear drive means to impart torque to said tuner shaft for driving the same, and presettable fine tuning means coupled to said annular gear for rotating the same, whereby said tuner shaft may be detent positioned to the desired channel by presetting said fine tuning means.

References Cited by the Examiner

UNITED STATES PATENTS

| | | | |
|---|---|---|---|
| 2,421,168 | 5/1947 | Stamper | 74—10.15 |
| 2,588,093 | 3/1952 | Dull | 74—10.33 |
| 2,808,506 | 10/1957 | Skwarek | 74—10.39 X |
| 3,065,642 | 11/1962 | Cappelle et al. | 74—10.8 X |

BROUGHTON G. DURHAM, *Primary Examiner.*